(12) United States Patent
Gupta

(10) Patent No.: US 10,581,783 B2
(45) Date of Patent: Mar. 3, 2020

(54) METHOD AND SYSTEM FOR CREATING DYNAMIC EMAIL SIGNATURES

(71) Applicant: Amit Gupta, San Francisco, CA (US)

(72) Inventor: Amit Gupta, San Francisco, CA (US)

(*) Notice: Subject to any disclaimer, the term of this patent is extended or adjusted under 35 U.S.C. 154(b) by 0 days.

(21) Appl. No.: 15/236,400

(22) Filed: Aug. 13, 2016

(65) Prior Publication Data

US 2017/0048181 A1    Feb. 16, 2017

Related U.S. Application Data

(60) Provisional application No. 62/204,500, filed on Aug. 13, 2015.

(51) Int. Cl.
*H04L 12/58* (2006.01)
*G06Q 30/02* (2012.01)

(52) U.S. Cl.
CPC ............ *H04L 51/18* (2013.01); *H04L 51/063* (2013.01); *G06Q 30/0269* (2013.01)

(58) Field of Classification Search
CPC ......... H04L 51/00–51/38; H04L 67/00–67/42; G06Q 30/00–30/0269
See application file for complete search history.

(56) References Cited

U.S. PATENT DOCUMENTS

| | | | | |
|---|---|---|---|---|
| 2007/0100947 | A1* | 5/2007 | Chen | G06Q 10/107 709/206 |
| 2008/0089277 | A1* | 4/2008 | Alexander | H04L 12/2816 370/328 |
| 2011/0035284 | A1* | 2/2011 | Moshfeghi | G06Q 30/02 705/14.58 |
| 2013/0159840 | A1* | 6/2013 | Nicolaescu | G06F 17/248 715/235 |
| 2013/0318199 | A1* | 11/2013 | Le Jouan | H04L 67/02 709/217 |
| 2016/0019256 | A1* | 1/2016 | Brewington | G06Q 10/107 707/758 |

OTHER PUBLICATIONS

A.J. Armstrong, "Exchange Server—Why are the emails in plain text format?", Mar. 18, 2015, pp. 1-7 (Year: 2015).*

* cited by examiner

*Primary Examiner* — Clayton R Williams
(74) *Attorney, Agent, or Firm* — White-Welker & Welker, LLC; Matthe T. Welker, Esq.

(57) ABSTRACT

A method to dynamically generate an email signature by merging information provided by a sender with a template that is centrally managed, but does not require the template to be distributed to the end-user devices. The email signature can contain various information including Name, Title, Phone, Location and more. Email signatures can also contain corporate or marketing information such as event information, job posting and other relevant content.

17 Claims, 2 Drawing Sheets

METHOD AND SYSTEM FOR CREATING DYNAMIC EMAIL SIGNATURES

FEDERALLY SPONSORED RESEARCH

Not Applicable

SEQUENCE LISTING OR PROGRAM

Not Applicable

CROSS REFERENCE TO RELATED APPLICATIONS

Not Applicable

TECHNICAL FIELD OF THE INVENTION

The present invention relates generally to email applications. More specifically, the present invention relates to systems and methods for dynamically generating an email signature by merging information provided by a sender with a template that is centrally managed.

BACKGROUND OF THE INVENTION

There are broadly two current methods to implement email signatures at a large scale as described below. Each method has advantages and disadvantages due to technical limitations.

In a first known method for email signatures, the email signatures that are created are on an email client program (eg, MICROSOFT OUTLOOK, APPLE MAIL, GOOGLE MAIL, etc.). These signatures are visible to the sender at the time of composition. The signatures can be installed into the client program if the client program supports software plugins.

Many email client programs are closed off and do not support 3rd party plugins (eg, IPHONE/IPAD MailApp. ANDROID Mail App). As such, updates to an email signature require an end-user to manually change the email signature. This process can be burdensome to end users if the email signature is to be changed frequently due to a new marketing messaging or continually changing branding requirements for an organization.

In a second known method for email signatures, email signatures are appended to an in-transit email on an email server (eg, MICROSOFT EXCHANGE) via a server-side component. These signatures are NOT visible to the sender. They are appended after the sender clicks send. This causes confusion for end-users who are accustomed to seeing their email signature and contact details when they are composing an email. If an end-user adds their own email signature to their email client, then the recipient may see an email that contains two email signatures—the one manually created by the end-user and the one centrally appended by the server.

This solution requires the server-side component to be pre-populated with sender information such as Name, Title, Phone etc. This can be a burden on the technical staff to keep data consistent. It also may require intrusive integrations with sensitive identity management systems such as MICROSOFT ACTIVE DIRECTORY or a human resources system. Even simple contact details may change frequently in an organization because of events such as marriage where a person's surname may change.

The present invention presents a solution where an end-user only needs to set their email signature once, and any further customization to the format of the email signature can be centrally managed without any plugin installation or the need for a server side component.

Definitions

Unless stated to the contrary, for the purposes of the present disclosure, the following terms shall have the following definitions:

"Application software" is a set of one or more programs designed to carry out operations for a specific application. Application software cannot run on itself but is dependent on system software to execute. Examples of application software include MS Word, MS Excel, a console game, a library management system, a spreadsheet system etc. The term is used to distinguish such software from another type of computer program referred to as system software, which manages and integrates a computer's capabilities but does not directly perform tasks that benefit the user. The system software serves the application, which in turn serves the user.

The term "app" is a shortening of the term "application software". It has become very popular and in 2010 was listed as "Word of the Year" by the American Dialect Society "Apps" are usually available through application distribution platforms, which began appearing in 2008 and are typically operated by the owner of the mobile operating system. Some apps are free, while others must be bought. Usually, they are downloaded from the platform to a target device, but sometimes they can be downloaded to laptops or desktop computers.

"API" In computer programming, an application programming interface (API) is a set of routines, protocols, and tools for building software applications. An API expresses a software component in terms of its operations, inputs, outputs, and underlying types. An API defines functionalities that are independent of their respective implementations, which allows definitions and implementations to vary without compromising each other.

"Email" or "electronic messages" is defined as a means or system for transmitting messages electronically as between computers or mobile electronic devices on a network.

"Email Client" or more formally mail user agent (MUA) is a computer program used to access and manage a user's email. A web application that provides message management, composition, and reception functions is sometimes also considered an email client, but more commonly referred to as webmail.

"EMS" is an abbreviation for email service providers, which are companies that provide email clients enabling users to send and receive electronic messages.

"Electronic Mobile Device" is defined as any computer, phone, smartphone, tablet, or computing device that is comprised of a battery, display, circuit board, and processor that is capable of processing or executing software. Examples of electronic mobile devices are smartphones, laptop computers, and table PCs.

"GUI". In computing, a graphical user interface (GUI) sometimes pronounced "gooey" (or "gee-you-eye")) is a type of interface that allows users to interact with electronic devices through graphical icons and visual indicators such as secondary notation, as opposed to text-based interfaces, typed command labels or text navigation. GUIs were introduced in reaction to the perceived steep learning curve of command-line interfaces (CLIs), which require commands to be typed on the keyboard.

The Hypertext Transfer Protocol (HTTP) is an application protocol for distributed, collaborative, hypermedia information systems.[1] HTTP is the foundation of data communication for the World Wide Web. Hypertext is structured text that uses logical links (hyperlinks) between nodes containing text. HTTP is the protocol to exchange or transfer hypertext.

The Internet Protocol (IP) is the principal communications protocol in the Internet protocol suite for relaying datagrams across network boundaries. Its routing function enables internetworking, and essentially establishes the Internet.

An Internet Protocol address (IP address) is a numerical label assigned to each device (e.g., computer, printer) participating in a computer network that uses the Internet Protocol for communication. An IP address serves two principal functions: host or network interface identification and location addressing.

An Internet service provider (ISP) is an organization that provides services for accessing, using, or participating in the Internet.

A "mobile app" is a computer program designed to run on smartphones, tablet computers and other mobile devices, which the Applicant/Inventor refers to generically as "a computing device", which is not intended to be all inclusive of all computers and mobile devices that are capable of executing software applications.

A "mobile device" is a generic term used to refer to a variety of devices that allow people to access data and information from where ever they are. This includes cell phones and other portable devices such as, but not limited to, PDAs, Pads, smartphones, and laptop computers.

A "module" in software is a part of a program. Programs are composed of one or more independently developed modules that are not combined until the program is linked. A single module can contain one or several routines or steps.

A "module" in hardware, is a self-contained component.

"REC" or "recipient email client" is the computer program used to access and manage a user's email when that user is the recipient of the email being tracked or monitored.

"RTS" or "remote tracking server" is a third party software module stored on and executed by a computer that communicates with a recipient email client to gather information about specific emails being received.

Simple Mail Transfer Protocol (SMTP) is an Internet standard for electronic mail (email) transmission.

"SMTP Relay", which stands for Simple Mail Transfer Protocol, lets you send email messages through your email account using your existing email service.

A "software application" is a program or group of programs designed for end users. Application software can be divided into two general classes: systems software and applications software. Systems software consists of low-level programs that interact with the computer at a very basic level. This includes operating systems, compilers, and utilities for managing computer resources. In contrast, applications software (also called end-user programs) includes database programs, word processors, and spreadsheets. Figuratively speaking, applications software sits on top of systems software because it is unable to run without the operating system and system utilities.

A "software module" is a file that contains instructions. "Module" implies a single executable file that is only a part of the application, such as a DLL. When referring to an entire program, the terms "application" and "software program" are typically used. A software module is defined as a series of process steps stored in an electronic memory of an electronic device and executed by the processor of an electronic device such as a computer, pad, smart phone, or other equivalent device known in the prior art.

A "software application module" is a program or group of programs designed for end users that contains one or more files that contains instructions to be executed by a computer or other equivalent device.

A "smartphone" (or smart phone) is a mobile phone with more advanced computing capability and connectivity than basic feature phones. Smartphones typically include the features of a phone with those of another popular consumer device, such as a personal digital assistant, a media player, a digital camera, and/or a GPS navigation unit. Later smartphones include all of those plus the features of a touchscreen computer, including web browsing, wideband network radio (e.g. LTE), Wi-Fi, 3rd-party apps, motion sensor and mobile payment.

A "computer system" or "system" consists of hardware components that have been carefully chosen so that they work well together and software components or programs that run in the computer. The main software component is itself an operating system that manages and provides services to other programs that can be run in the computer. The complete computer made up of the CPU, memory and related electronics (main cabinet), all the peripheral devices connected to it and its operating system. Computer systems fall into two categories: clients and servers.

Clients are the user's laptop, desktop and tablet computers and smartphones, while servers share their data and applications with multiple users.

UID is an abbreviation for Unique Identifier, which in the present invention is a remote transparent image embedded in an email.

URL is an abbreviation of Uniform Resource Locator (URL), it is the global address of documents and other resources on the World Wide Web (also referred to as the "Internet").

A "User" is any person registered to use the computer system executing the method of the present invention.

In computing, a "user agent" or "useragent" is software (a software agent) that is acting on behalf of a user. For example, an email reader is a mail user agent, and in the Session Initiation Protocol (SIP), the term user agent refers to both end points of a communications session. In many cases, a user agent acts as a client in a network protocol used in communications within a client-server distributed computing system. In particular, the Hypertext Transfer Protocol (HTTP) identifies the client software originating the request, using a "User-Agent" header, even when the client is not operated by a user. The SIP protocol (based on HTTP) followed this usage.

A "web application" or "web app" is any application software that runs in a web browser and is created in a browser-supported programming language (such as the combination of JavaScript, HTML and CSS) and relies on a web browser to render the application.

A "website", also written as Web site, web site, or simply site, is a collection of related web pages containing images, videos or other digital assets. A website is hosted on at least one web server, accessible via a network such as the Internet or a private local area network through an Internet address known as a Uniform Resource Locator (URL). All publicly accessible websites collectively constitute the World Wide Web.

A "web page", also written as webpage is a document, typically written in plain text interspersed with formatting instructions of Hypertext Markup Language (HTML, XHTML). A web page may incorporate elements from other websites with suitable markup anchors.

Web pages are accessed and transported with the Hypertext Transfer Protocol (HTTP), which may optionally employ encryption (HTTP Secure, HTTPS) to provide security and privacy for the user of the web page content. The user's application, often a web browser displayed on a computer, renders the page content according to its HTML markup instructions onto a display terminal. The pages of a website can usually be accessed from a simple Uniform Resource Locator (URL) called the homepage. The URLs of the pages organize them into a hierarchy, although hyperlinking between them conveys the reader's perceived site structure and guides the reader's navigation of the site.

SUMMARY OF THE INVENTION

The present invention teaches a novel method to dynamically generate an email signature content by merging information provided by a sender with a template that is centrally managed, but does not require the rendered email signature to be distributed to the end-user devices.

The scope of the present invention is related to the signature portion of an email, not to be confused with document electronic signature signing. The email signature can contain various information including Name, Title, Phone, Location and more. Email signatures can also contain corporate or marketing information such as event information, job posting and other relevant content.

BRIEF DESCRIPTION OF THE DRAWINGS

The accompanying drawings, which are incorporated herein form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the present invention.

There are numerous problems associated with the both methods above. Particularly in the context of large organizations that have a mix of different email programs. If an organization desires to update email signatures across thousands of employees each of whom may have multiple devices, then they must first have each of the thousands employees have a plugin installed in supported email programs. If the email program does not support a plugin, than many organizations request that the senders manually copy and paste an email signature from a central repository or internal website. This is prone to errors and can result in formatting distortions when intricate email signatures are involved. This also leads to non-compliance by end-users who do not want to be burdened with the manual process.

The method of the present invention taught here is a hybrid that allows for a sender to have a simple signature which may be text-only and can be easily customized by the end-user without risk of formatting issues. The customizations can contain raw data elements such as their name, title, phone, etc. as shown in FIG. 1.

Figure 1:
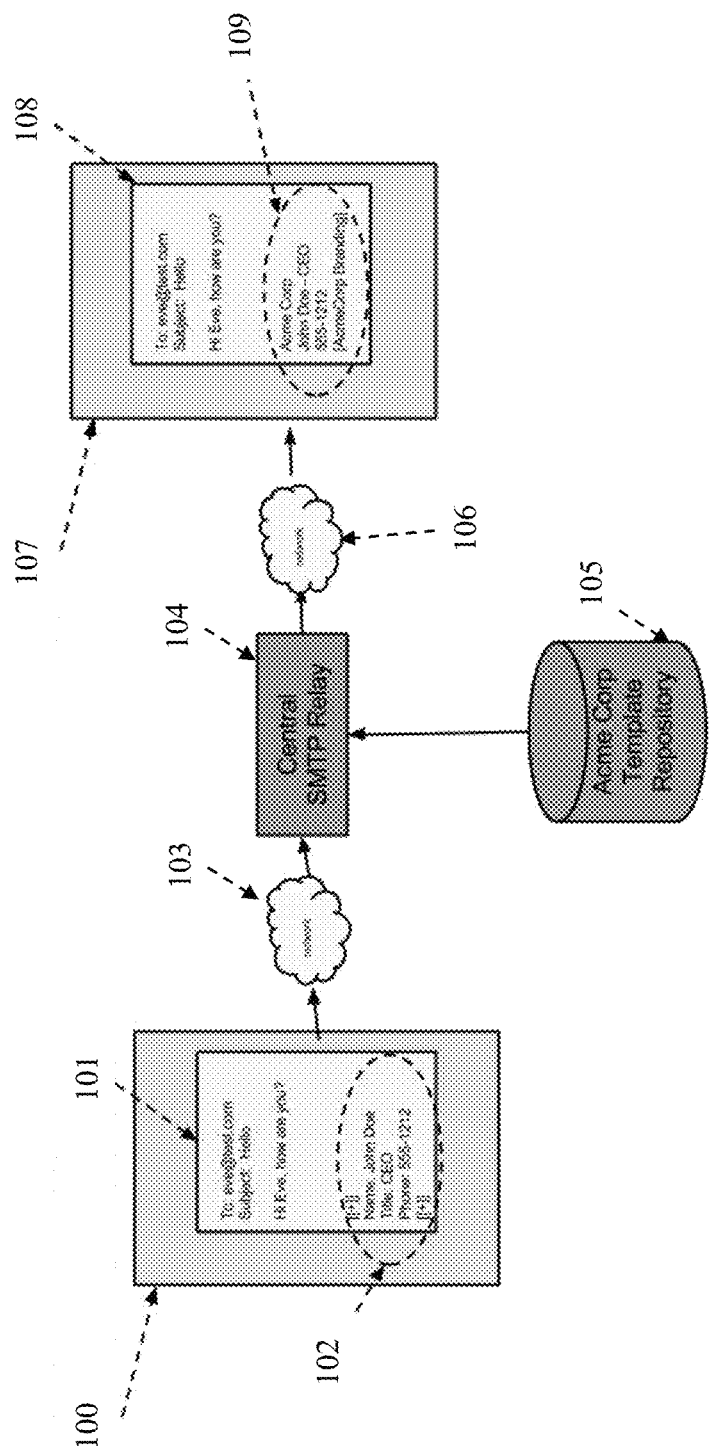
FIG. 1 is a flow chart illustrating the process/method for creating a dynamic email signature.
Figure 2:
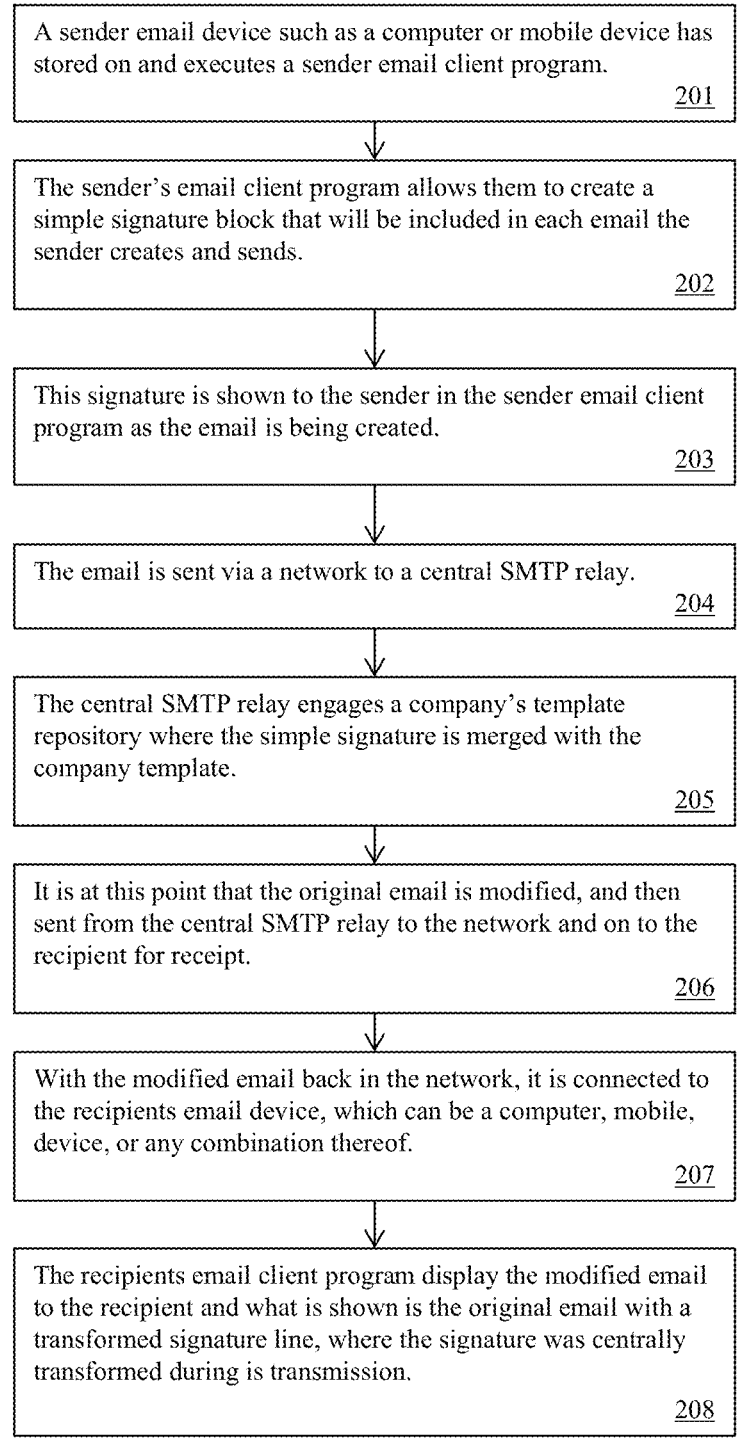
FIG. 2 is a flow chart illustrating the central transformation process for creating a dynamic email signature.

Now referring to FIGS. 1 and 2, a sender email device 100 such as a computer or mobile device has stored on and executes a sender email client program such as OUTLOOK 201. The sender's email client program 101 allows them to create a simple signature block 102 that will be included in each email the sender creates and sends 202. This signature is shown to the sender in the sender email client program as the email is being created 203.

Next the email is sent 204 via a network 103 to a central SMTP relay 104. The central SMTP relay engages a company's template repository 105 where the simple signature is merged with the company template for that specific user or user group 205, which may be based on position or department. It is at this point that the original email is modified, and then sent from the central SMTP relay 104 to the network 106 and on to the recipient for receipt 206.

The sent email can contain a text and/or HTML body. The email templates stored on the SMTP Relay 104 via the template repository 105 can have corresponding text and/or HTML templates which will be merged with the original email depending on the body type.

Finally, with the modified email back in the network 106, it is connected to the recipients email device 107, which can be a computer, mobile, device, or any combination thereof 207. The recipients email client program 108 will display the modified email to the recipient and what is shown is the original email with a transformed signature line 109, where the signature was centrally transformed during is transmission 208.

The present invention would start with a sender composing an email that contains a specially formatted email signature (ie a "Signature Block"). The Signature Block contains one or more markers to indicate metadata such as contact details like Name, Title, Phone etc. The Signature Block is then processed, merged, and transformed with a centrally managed visual template after the email is sent either on the email server, or on a SMTP email relay in between the sender and recipient.

The visual template may contain dynamically generated content that can be influenced by the content or metadata of the email being sent.

The central SMTP Relay may override sender attributes such as Title or Phone based on policy as well. The central SMTP Relay then inserts or removes fields from a template based on the existence of a field in the Signature Block. The central SMTP Relay recording detection of the Signature Block for compliance reporting.

At the completion of the method, a recipient receives an email that contains the merged and transformed signature along with the original message content/body.

In an alternative embodiment, the SMTP Relay can insert banner advertisements or other content that can be targeted based on details of the email such as sender, recipient, keywords in the email, email client device, or email headers.

In yet another embodiment, the dynamically generated signature can be configured on systems such as SALESFORCE.COM or other 3rd party platforms. The $3^{rd}$ party platform can then be configured to send email through the SMTP relay. This allows central management of email systems not only across devices and email clients, but also across systems that can be used to send out email which do not have an email client installed.

In still another embodiment, the method of the present invention could be a piece of software that interacts with an email server such as a MICROSOFT EXCHANGE server or a GOOGLE for Work email service. In this embodiment, the method of the present invention is embodied in a software application that replaces the functionality of the SMTP relay in executing the method of the present invention. In this embodiment, the email server executes the software embodying the present invention and a separate SMTP relay server is not necessary.

The system is set to run on a computing device or mobile electronic device. A computing device or mobile electronic device on which the present invention can run would be comprised of a CPU, Hard Disk Drive, Keyboard, Monitor, CPU Main Memory and a portion of main memory where the system resides and executes. Any general-purpose computer, smartphone, or other mobile electronic device with an appropriate amount of storage space is suitable for this purpose. Computer and mobile electronic devices like these are well known in the art and are not pertinent to the invention. The system can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A computer-based method for creating dynamic email signatures, the method comprising the steps of:
   providing on and executing non-transitory computer-readable media for composing, sending, and receiving email, by a computer machine;
   composing an email that contains a specially formatted email signature block by a sender on a computer machine for transmission to an email server,
   wherein the signature block contains markers to indicate metadata;
   sending the email containing the signature block by the email server;
   providing an SMTP relay;
   processing, merging, and transforming the signature block with a centrally managed visual template;
   inserting or removing fields from the centrally managed visual template based on the existence of a field in the signature block,
   wherein the fields correspond to metadata in the signature block;
   merging the signature block into body of the email;
   wherein a processing and a merging of the signature block with the centrally managed visual template occurs on the SMTP relay in between the sender and a recipient; and
   delivering a derivative email to the recipient that contains a merged and a transformed signature block with the centrally managed visual template.

2. The method of claim 1, wherein the signature block is processed and merged with a centrally managed visual template after the email is sent either on the email server, or on a SMTP email relay in between the sender and recipient.

3. The method of claim 1, wherein a metadata contains name, title, phone, and address.

4. The method of claim 1, wherein the process and merging of the signature block with a centrally managed visual template occurs on the email server.

5. The method of claim 4, wherein a software application stored and running on the email server executes the processing and merging of the signature block with a template.

6. The method of claim 1, wherein the visual template contains dynamically generated content are influenced by the content or metadata of the email being sent.

7. The method of claim 1, wherein a merged template is personalized in real-time based on a combination of the content of the email and the recipient.

8. The method of claim 1, wherein a merged template is personalized based on the attributes of the sender.

9. The method of claim 1, wherein a merged template is personalized based on the sender or recipient device.

10. The method of claim 9, wherein one or more email templates stored on the SMTP Relay have corresponding text and/or HTML templates which will be merged with the original email depending on the body type.

11. The method of claim 1, wherein the central SMTP relay overrides the sender attributes based on policy.

12. The method of claim 1, wherein the central SMTP relay records detection of the signature block for compliance reporting.

13. The method of claim 1, further comprising the steps of
   providing a template repository, wherein the template is a snippet of text or HTML that optionally contains merge fields;
   selecting a template; and
   transforming the email by the SMTP relay.

14. The method of claim 1, wherein the central SMTP relay inserts banner advertisements or other content that can be targeted based on email details.

15. The method of claim 1, wherein one or more email details determining the banner advertisements or other content inserted by the central SMTP relay are: sender, recipient, keywords in the email, email client device, or email headers.

16. The method of claim 1, further comprising the steps of:
   configuring the dynamically generated signature on 3rd party platforms;
   configuring the $3^{rd}$ party platform to send emails through the SMTP relay;
   creating central management of email systems across systems that can be used to send out emails from clients which do not have an email client installed.

17. The method of claim 16, wherein central management of email occurs across devices, email clients, and systems that can be used to send out email which do not have an email client installed.

\* \* \* \* \*